(12) United States Patent
Bade et al.

(10) Patent No.: US 11,495,227 B2
(45) Date of Patent: Nov. 8, 2022

(54) ARTIFICIAL INTELLIGENCE (AI) BASED USER QUERY INTENT ANALYZER

(71) Applicant: ACCENTURE GLOBAL SOLUTIONS LIMITED, Dublin (IE)

(72) Inventors: Sawani Bade, Bangalore (IN); Himani Bhatt, Bangalore (IN); Debayan Chakraborty, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 336 days.

(21) Appl. No.: 16/990,460

(22) Filed: Aug. 11, 2020

(65) Prior Publication Data

US 2022/0051665 A1 Feb. 17, 2022

(51) Int. Cl.

| | |
|---|---|
| *G10L 15/22* | (2006.01) |
| *G06N 5/04* | (2006.01) |
| *G06N 5/02* | (2006.01) |
| *G06F 16/25* | (2019.01) |
| *G06F 40/205* | (2020.01) |
| *G06F 16/28* | (2019.01) |
| *G10L 15/26* | (2006.01) |
| *G06F 40/289* | (2020.01) |
| *G06F 16/2452* | (2019.01) |

(52) U.S. Cl.
CPC ........ *G10L 15/22* (2013.01); *G06F 16/24522* (2019.01); *G06F 16/252* (2019.01); *G06F 16/284* (2019.01); *G06F 40/205* (2020.01); *G06F 40/289* (2020.01); *G06N 5/02* (2013.01); *G06N 5/04* (2013.01); *G10L 15/26* (2013.01)

(58) Field of Classification Search
CPC ......... G06F 40/40; G06F 16/144; G10L 15/22
See application file for complete search history.

(56) References Cited

U.S. PATENT DOCUMENTS

| | | | |
|---|---|---|---|
| 9,864,795 B1 * | 1/2018 | Halevy | G06F 16/285 |
| 2010/0082331 A1 * | 4/2010 | Brun | G06F 40/205 |
| | | | 704/9 |
| 2011/0191276 A1 * | 8/2011 | Cafarella | G06F 16/358 |
| | | | 707/723 |

* cited by examiner

*Primary Examiner* — Daniel Abebe
(74) *Attorney, Agent, or Firm* — Mannava & Kang, P.C.

(57) ABSTRACT

An Artificial Intelligence (AI) based user intent analyzer system analyzes a received user query to determine an intent of the user query and enables execution of processes on a backend system based on the user intent. The user query is divided into a plurality of portions and the portions with extraneous information are discarded. The remaining portions are parsed with a plurality of parsers. The output from the plurality of parsers is processed for extraction of the entities, entity attributes, verbs, and verb arguments. The entities and verbs are further filtered using knowledge graphs and the remaining entities and verbs are mapped to sub-intents using intent mapping rules retrieved from the knowledge graphs. The sub-intents are mapped to the final intent using process rules associated with the process to be executed by the backend system in response to the user query.

20 Claims, 14 Drawing Sheets

The man saw the boy on the platform near Warwick last night.

```
'verb_negated': False,
'isquery': False,
'query': [],
'Subj': [(('the',0),('man',1))],
'V': [('saw',
2),
(
  'verb_phrase': 'saw',
  'Tag': ['VBD'],
  'verb_analysis_element': [(('saw',2,'VERB','VBD')]
)],
'Obj': [(('the',3),('boy',4)],
'Temporal_phrases': [(('last',10),('night',11)],
'locative_phrases': [(('on',5),(('the',6),('platform',7),('near',8),('Warwick',9)]
]
```

The Man did not see the boy on the platform. Are you sure you saw him?

FIG. 9B

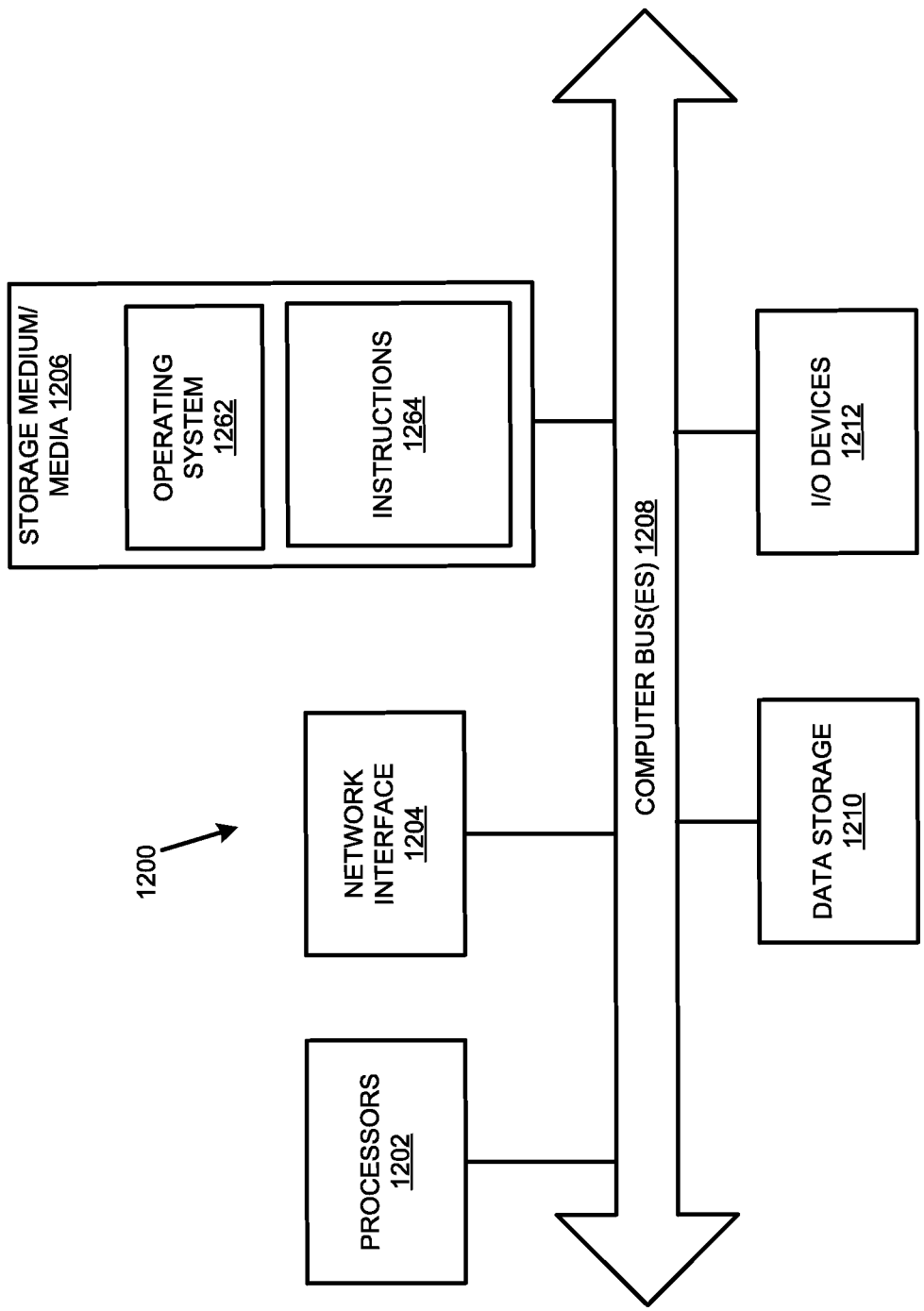

ARTIFICIAL INTELLIGENCE (AI) BASED USER QUERY INTENT ANALYZER

BACKGROUND

Customer service systems are configured from different technologies to satisfy the requirements of organizations in delivering goods or services to customers. Large organizations require complex computer systems and communication networks to handle customer queries that may be received via different modalities for different purposes. Computers and the internet have become essential for providing customer services. Furthermore, the advent of Artificial Intelligence (AI) has enabled the development of advanced customer service tools that can automate some of the customer service tasks. Automated voice response systems, chatbots, customer service portals, etc. are some AI-based tools that enable an organization's interaction with the customers. Technologies such as robotic process automation (RPA) enable entirely automating certain processes within the organizations.

BRIEF DESCRIPTION OF DRAWINGS

Features of the present disclosure are illustrated by way of examples shown in the following figures. In the following figures, like numerals indicate like elements, in which:

FIG. 9A shows an example data structure corresponding to a verb object that is generated in accordance with the examples disclosed herein.

FIG. 9B shows another example data structure corresponding to another verb object that is generated in accordance with the examples disclosed herein.

FIG. 12 illustrates a computer system that may be used to implement the intent analysis system.

DETAILED DESCRIPTION

Figure 1:
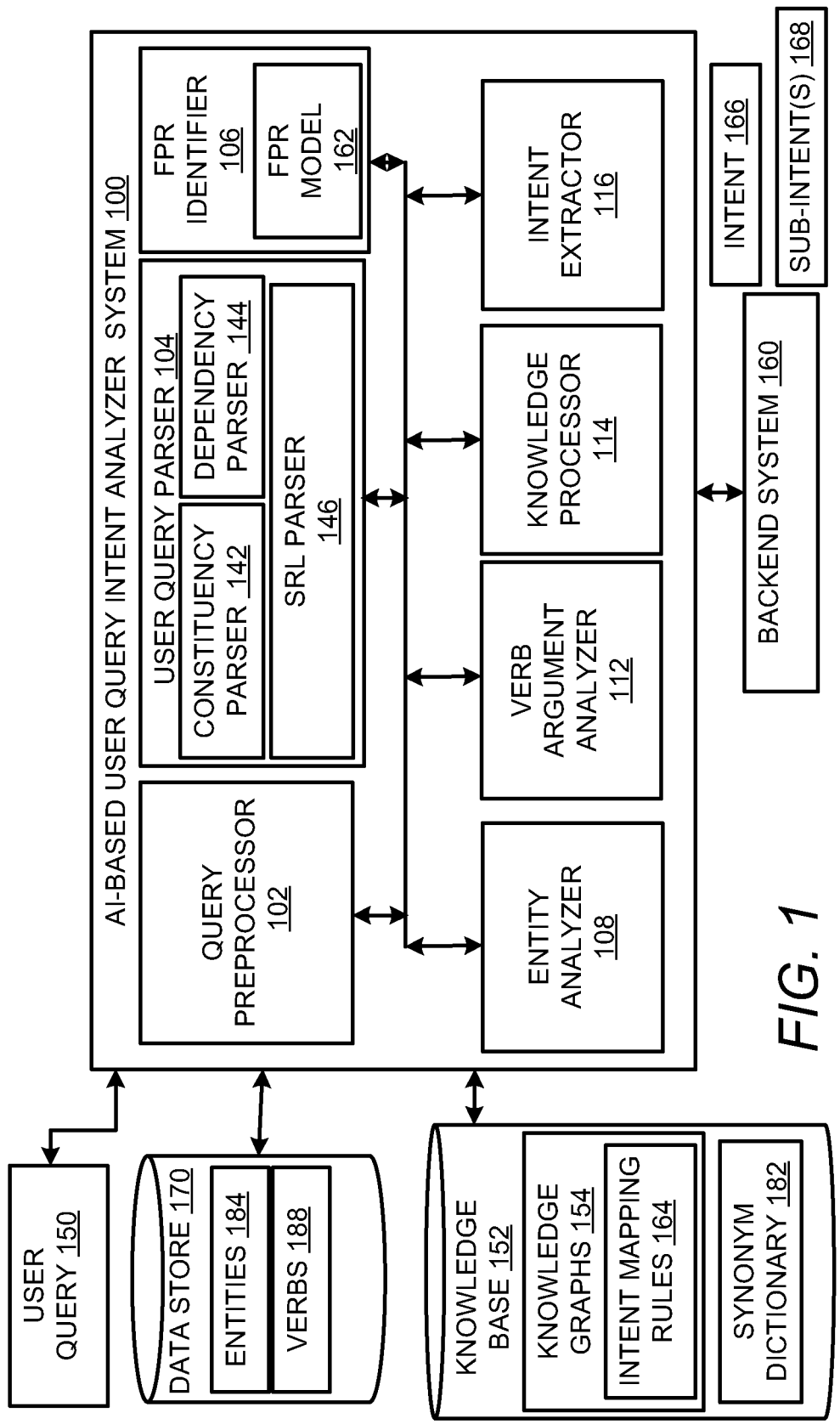
FIG. 1 shows a block diagram of an AI-based user query intent analysis system in accordance with the examples disclosed herein.

For simplicity and illustrative purposes, the present disclosure is described by referring to examples thereof. In the following description, numerous specific details are outlined to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

An AI-based user intent analysis system analyzes a received user query, determines an intent conveyed in the user query, and enables execution of a process in a backend system in accordance with the examples disclosed herein. The intent can pertain to a keyword or other trigger that initiates the process within the backend system. The user query can be received via different modalities such as an utterance or voice input from the user, a text, etc. The user query is initially parsed via a plurality of parsers which can include a constituency parser, a dependency parser, and a semantic role labeling (SRL) parser. The parser output is then processed via a facts-promise-resolution (FPR) model to identify a plurality of portions within the user query wherein the plurality of portions includes a facts portion, a promise portion, a resolution portion, and an extraneous information portion. The extraneous information portion includes parts of the user query that are not required for the execution of the backend system process. Hence, the extraneous portion of the user query is discarded from further processing while a subset of the plurality of portions that includes the facts portion, the promise portion, and the resolution portion are selected for further processing. The FPR model, in an example, may be a classifier model based on the conditional random field (CRF) methodology. The accuracy of the facts portion and the promise portion can be determined from the data retrieved from the backend system while the resolution portion includes the request or intent of the user query. Based on the validation of the facts and the promise portion, a process to accede or deny the request or resolution may be executed on the backend system.

The subset of the plurality of portions is further processed for entity and entity attribute extraction. In an example, the output from one or more of the plurality of parsers with the tags can be employed to identify nouns which can be stored as entities. Additionally, the tags can be used to identify the qualifiers of the nouns as entity attributes. Similarly, the tags in the outputs from the plurality of parsers can be used to extract verbs and different arguments of the verbs. The identified verbs can include verb phrases with multiple words that include a major verb and one or more words preceding or following the major verb. The arguments can include the subjects and objects determined relative to the major verb(s), temporal words or phrases indicative of the time, location words or phrases indicative of a location, tenses of the verbs, etc. In an example, the synonyms of the entities, the entity attributes, the verbs, and the arguments of the verbs can be identified from a synonym dictionary. The extracted entities and verbs along with the identified synonyms are combined with other related words from the user query to form tuples.

The tuples thus formed can be validated via knowledge graphs that encode domain knowledge pertaining to the processes executed by the backend system. The tuples with one or more words occurring the knowledge graphs can be retained while those that were not identified in the knowledge graphs can be provided to log analytics for the AI trainer to identify as possible extension of the knowledge graph. The knowledge graphs are used to categorize the entity-relationship-attributes and verb-arguments extracted and validated. The categories in turn enable retrieval of intent mapping rules that map the entities and their attributes and the verbs and their arguments to one or more sub-intents or intermediate intents. The sub-intent(s) or the intermediate intents are then employed using process rules associated with the backend system to identify a final intent or the intent conveyed in the user query. The intent thus derived can be used to drive the backend system process. In an example, the backend process can involve an RPA process that is triggered by the intent that is passed on by the intent analysis system to the backend system. The process executed by the backend system may produce an output approving or rejecting the resolution or request in the user query. In an example, the output of the backend process can be conveyed to the user via a user interface such as a chatbot, a voice interface, a return email, etc. which initially received the user query.

The AI-based intent analysis system as disclosed herein provides for technical improvement in user queries or request analyses by providing for intent identification from user queries at varying levels of granularity and enabling the correct processes to occur on the backend system which in turn causes the automated response systems to provide more accurate responses. This is because not only are the entities and entity attributes extracted but also the verbs and verb arguments are extracted in addition to identifying the tenses of the verbs from the user query. Therefore, the intent analysis system is configured for obtaining a nuanced understanding that enables identifying subtle differences in the intents that are caused by the presence or absence of even one or two words. For example, the tense analysis procedure disclosed herein enables the intent analysis system to identify the difference between the verb 'paid' versus 'will be paid'. Furthermore, the extraction of entities and verbs enables the intent analysis system to identify and extract multiple and related intents in the same user query as the outputs from multiple parsers are processed. Accordingly, the backend process to be executed can be accurately identified and precise, pointed responses can be provided to the user in response to the user query.

Moreover, the intent analysis system can be scaled up to process newer concepts as they are introduced within the backend system with little or no training due to the different levels of intent that are processed at the sub-intent and the final intent level. A difficulty exists in user query response systems that whenever new concepts and the corresponding new processes are introduced into the backend systems, the user interaction systems between the backend system and the customer front end such as customer service systems including voice response systems or the chatbots need to be trained to process user queries pertaining to the newer concepts. However, procuring training data for the newer concepts can be difficult as training data is generally obtained from historical logs that would not exist for the newer concepts. Therefore, the training data would need to be generated anew and the automated aspects of the user interaction system would be unavailable for processing the user queries pertaining to the newer concepts. As the intent processing system is configured to identify intents at different granularities, the user query pertaining to the new concepts can be processed to identify the intent at a higher level so that the user interaction system can at least provide an approximate response even as the training data for the new concepts is built up and/or the knowledge graphs are updated.

FIG. 1 shows a block diagram of an AI-based user query intent analysis system 100 in accordance with the examples disclosed herein. The intent analysis system 100 receives a user query 150 pertaining to a process that can be executed by a backend system 160. The user query 150 can be received via various modalities including but not limited to, a voice input, a question put to a chat bot, a request provided through a graphical user interface (GUI), an email, as a video input, etc. The intent analysis system 100 analyzes the user query 150 to identify an intent 166 (i.e., the final intent) of the user query 150. The intent 166 of the user query 150 is used to determine if the process can be executed on the backend system 160 and the output to be produced upon the execution the process on the backend system 160. The intent analysis system 100 may be communicatively coupled to a non-transitory data store 170 for storage of data generated and used during the intent analysis process.

The intent analysis system 100 includes a query preprocessor 102, a user query parser 104, a facts-promise-resolution (FPR) identifier 106, an entity analyzer 108, a verb argument analyzer 112, a knowledge processor 114 and an intent extractor 116. When the user query 150 is received in modalities other than textual input, e.g., as a voice input or as a video, the received input can be initially converted into textual format by a query preprocessor 102 using a voice to text Application Programming Interfaces (APIs). The textual format of the user query 150 is then provided to the user query parser 104. The user query parser 104 generates multiple outputs corresponding to different parses generated by a plurality of parsers which can include a constituency parser 142, a dependency parser 144 and an SRL parser 146. The constituency parser 142 produces a syntactic parse which includes phrases in the user query 150. Output from the constituency parser 142 can also include the type of phrases in the user query 150, e.g., identification of a phrase as one of a noun phrase, a verb phrase, an adverbial phrase, a prepositional phrase, etc. The dependency parser 144 produces an output that includes the relationships between the individual words in the user query 150. For example, the dependency parse includes information such as whether a word is a subject, or whether a word is a modifier of a noun or an adjective, etc. The SRL parser 146 provides input related to a verb perspective. The SRL parser 146 identifies the action words in the user query 150 and produces an output identifying the subject and the object of each of the verbs, whether the verb is negated, and other information related to the verb.

The output from the SRL parser 146 is provided to the FPR identifier 106 which identifies a plurality of portions from the user query 150, wherein the plurality of portions include at least a fact portion, a promise portion, a resolution portion and a redundant information portion. More particularly, the user query 150 can be modeled as a combination of the plurality of portions. The facts portion pertains to one or more facts conveyed in the user query 150, the promise portion pertains to one or more promises made to the user or one or more expectations of the user based on data conveyed to the user while the resolution portion can pertain to the resolution expected by the user or the outcome desired by the user in response to the user query 150. In addition, certain portions of the user query 150 may be identified as redundant information which includes information that is not required for intent identification or for the execution of the backend process. Hence, a subset of the plurality of portions that includes only the facts portion, the promise portion and the resolution portion of the user query 150 can be selected for further analysis while the redundant information portion of the user query 150 is discarded from further processing/consideration. As a result, not only is the processing burden on the intent analysis system 100 reduced but also the training data to train different component parts of the intent analysis system 100 is reduced. As a result, the processing speed of the intent analysis system 100 is improved while enabling the intent analysis system 100 to produce a more accurate output since the redundant information portion is discarded. For example, a phrase such as, "I have . . . ", indicates facts pertaining to what the user currently possesses. Similarly, "I was told . . . " can be indicative of the promise made to the user. A user utterance such as "Can you please . . . " can be classified as an expected resolution. In many instances, users' requests pertaining to products/services can contain extraneous or additional information that is unnecessary for processing the user request and may not always be structurally or syntactically accurate. This can be especially true when users convey their request verbally. For example, the user query or the user utterance can include, "I was told at the beginning of February that due to me just having a kidney transplant and not working just now that I could phone each month and arrange payment for the 15th so that my services don't get cut off before that date the reason being was that I now wasn't working and got my money on the 15th of each month so if you check you will see that's the date I phone in to pay it or pay online. But I am working now and am no longer getting paid on the 15th instead it is 30th which is why my bill payment was delayed and you have restricted my services. Can you please bring them up?" The FPR model 162 enables identifying phrases such as " . . . 15th of each month so if you check you will see that's the date I phone and pay it or pay online, . . . my bill payment was delayed . . . you have restricted my services . . . " as facts, "I was told at the beginning of February that . . . I could phone each month and arrange payment for the 15th so that my services don't get cut off before that date" as promise and " . . . . Can you please bring them up?" as request. The remaining phrases may be disregarded as extraneous information by the FPR identifier 106. In yet another illustrative example, the user query 150 may include, "My bill says $600; however, the agreed price is as part of the negotiation to join was on the basis that I did not pay the installation. Please remove it". The entities 'installation' and 'price' may be extracted. The promise identified can include [ARG1: part of the negotiation to join'; 'V: was", "ARG2: on the basis that I did not pay the installation. Please remove it"]. The facts that are extracted can include ['ARG1: My bill', 'V:saying', 'ARG3: $600 however the agreed price is']. The request includes ['ARG0: I', 'ARCM-NEG:not', 'ARG3: the installation. Please remove it']. Therefore, the FPR identifier 106 enables removal of such extraneous information to enable a more efficient processing of the user query 150. In an example, the FPR identifier 106 can utilize an FPR model 162 for the identification of the plurality of portions. The FPR model 162 in an example, may be based on the CRF methodology.

The plurality of portions which are identified as one of facts, promise and request are further processed by an entity analyzer 108 for identification and processing of the entities present therein. In an example, the entity analyzer 108 identifies entities 184 by using attributes like parts of speech (POS) tags generated by at least one of the plurality of parses for each word in the user query 150. In an example, the nouns from the user query 150 can be identified as entities. If one or more entities are identified from the user query 150, the entities can be further processed for entity attribute identification. In an example, one of the attributes identified for an entity includes an affordance attribute which is indicative of a state of the entity from a plurality of states that may be associated with the entity. By way of illustration and not limitation, a bill entity may have affordance attributes such as paid, unpaid, due, overdue, etc. Similarly, a service affordance attribute may include restore, discontinue, restart, start, upgrade states which can be associated with a service entity etc. The synonyms of the entities, other linguistic constructs such as the morphological forms of the synonyms etc. can also be extracted from a synonym dictionary 182. In addition, pairs including the entities and each of the words in the user query 150 can be generated by the entity analyzer 108. An example user query or utterance can include, "I just got my first bill and it says that I have an activation fee of X dollars. I was told that there would be no activation fee by the guy who signed me up." Entities such as, 'activation fee', 'first bill', 'guy' 'fee have', 'signed guy', 'bill got', 'activation', 'fee be' can be extracted from the user utterance. The intent and sub-intents that are extracted can include 'first bill' and 'activation fee'.

The output of the FPR identifier 106 is additionally passed on to a verb argument analyzer 112. The verb argument analyzer 112 is configured to identify the verbs in the user query 150 and the various arguments or properties of the verbs in the user query 150. Verb arguments such as but not limited to, the major verb, the auxiliary verbs, whether the verb is negated, the subject of the major verb, the indices of the different verbs, etc. can be extracted by the verb argument analyzer 112. In an example, the verb phrases, the major verb, the auxiliary verbs, etc., can be identified based on the POS tags provided to the words of the user query 150 by the SRL parser 146. The various verb arguments thus extracted can be used to form a 'verb object' which is provided as the output of the verb argument analyzer 112.

The outputs from the entity analyzer 108 and the verb argument analyzer 112 are provided to a knowledge processor 114. The knowledge processor 114 can be configured to determine if the entities and/or the entity attributes, the verbs 188 and the verb arguments are included in a knowledge base 152. The knowledge base 152 contains the domain knowledge associated with the processes executed by the backend system 160. In an example, the domain knowledge can be stored as knowledge graphs 154 with the nodes representing the entities and attributes while the edges connecting the nodes representing the relationships between the nodes (i.e., the entities and their attributes). The knowledge graphs 154 may also encode verbs and verb arguments in a manner similar to the entities and the attributes. By way of illustration and not limitation, if the backend system 160 pertains to a billing system for communication services such as internet, phone, cable television, etc., then the knowledge base 152 includes knowledge graphs representing the various entities or verbs that are used in billing processes of the communication services. The knowledge base 152 therefore encodes knowledge of processes possessed by subject matter experts (SMEs) thereby making it reusable. The entities 184/entity attributes and the verb 188/verb arguments that are correspondingly extracted from the user query 150 and which are identified from the knowledge base 152 by the knowledge processor 114 are retained for further analysis. The entities/entity attributes or the verb/verb arguments which are not identified from the knowledge base 152 by the knowledge processor 114 are discarded from further consideration. Therefore, in addition to discarding the redundant information portion, the intent analysis system 100 is further configured to filter entities or verbs that are irrelevant to the backend system processes via the knowledge processor 114. The entities 184/entity attributes and the verbs 188/verb arguments are therefore automatically validated prior to intent generation.

In an example, the knowledge processor 114 can be further configured to identify categories for each of the entity/entity attributes or the verbs/verb arguments from the knowledge graphs 154. Different entities and entity attributes can belong to different categories. Each category may include an entity and synonyms, morphological forms or other ways of expressing that entity. Similarly, different verbs and verb arguments may be placed into different categories. For example, words such as, bill, invoice, receipt, etc., may belong to one category while the various bill details may belong to other categories. Similarly, the entity 'service' may belong to one category while service issues may belong to another category. The various categories enable identifying intent at different granularities. For example, identification of the category at the 'bill' level only enables the intent analysis system 100 to determine that the user query 150 pertains to a bill without further details regarding the specific aspects of the bill that the user query 150 refers to. On the other hand, if the attributes of the 'bill' entity are extracted and categorized by the knowledge processor 114, the particular aspects of the bill that the user query 150 refers to can be further determined.

The entities 184/entity attributes and the verbs 188/verb arguments and categories associated therewith thus selected by the knowledge processor 114 are provided to the intent extractor 116. The intent extractor 116 identifies one or more of the intent mapping rules 164 to be applied to the received data in order to extract at least an intent 166 and one or more sub-intents 168. In an example, the intent mapping rules 164 may be stored in the nodes of the knowledge graphs 154 that are reached by the knowledge processor 114 when searching for the entities/verbs. Based on the knowledge graph nodes, hierarchical intents can be extracted by the intent extractor 116 so that the intent 166 is identified at a higher level of the hierarchy at the parent node while the one or more sub-intents 168 may be obtained at the lower level i.e., at the child nodes of the knowledge graph hierarchy. The intent 166 can enable identifying the process to be executed by the backend system 160 while the sub-intents 168 can identify one or more sub-processes or provide arguments/values to the process to be executed by the backend system 160. In an example, the backend system 160 may approve or reject the request or resolution in the user query 150 based on the validation of the entities 184 and the verbs 188 from the facts portion and the promise portion based on corresponding process rules. Referring to the example discussed earlier regarding paying for services on the 15th of a month, the entity analyzer 108 and the verb argument analyzer 112 extract (payment), (payment, bill), (payment, delayed), (services, restricted), (payment, date), (date, payment) as tuples for intent identification. The intents extracted can include "bill.payment.delayed", "services.restricted", "payment date". Accordingly, the backend system 160 initiates processes for handling delayed bill payment due to which services were restricted and for adjustment of payment date if permissible by the appropriate rules.

Figure 2:
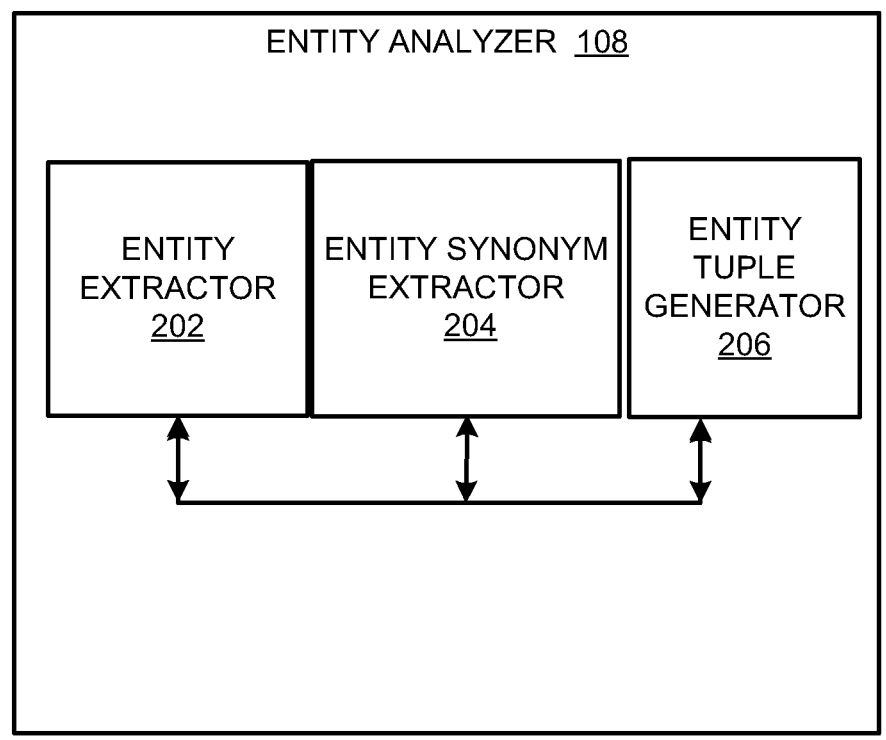
FIG. 2 shows a block diagram of an entity analyzer in accordance with the examples disclosed herein.

FIG. 2 shows a block diagram of the entity analyzer 108 in accordance with the examples disclosed herein. The entity analyzer 108 includes an entity extractor 202, an entity synonym extractor 204 and an entity tuple generator 206. The entity extractor 202 can employ techniques developed using libraries such as but not limited to, Natural Language Tool Kit (NLTK), SpaCy, etc., for entity extraction. In an example, entities can include nouns or other named entities. Attributes of the entities including the affordance attributes are also extracted by the entity extractor 202. The entity synonym extractor 204 uses the synonym dictionary 182 for identifying and extracting synonyms of the entities and entity attributes. Techniques such as text matching may be employed for synonym identification. The entity tuple generator 206 generates tuples of each of the entities (including the entity synonyms) with each of the words in the user query 150 that the entity has a direct dependency relation with. The data regarding the direct dependency relations can be obtained from the output of the dependency parser 144 which is accessed by the entity tuple generator 206 for the generation of the entity pairs. In addition, tuples of entities included in the user query 150 are also generated if more than one entity is included in the user query 150. The entity-word tuples and the tuples of entities are provided to the knowledge processor 114 for the selection of entities pertaining to the backend system processes.

Figure 3:
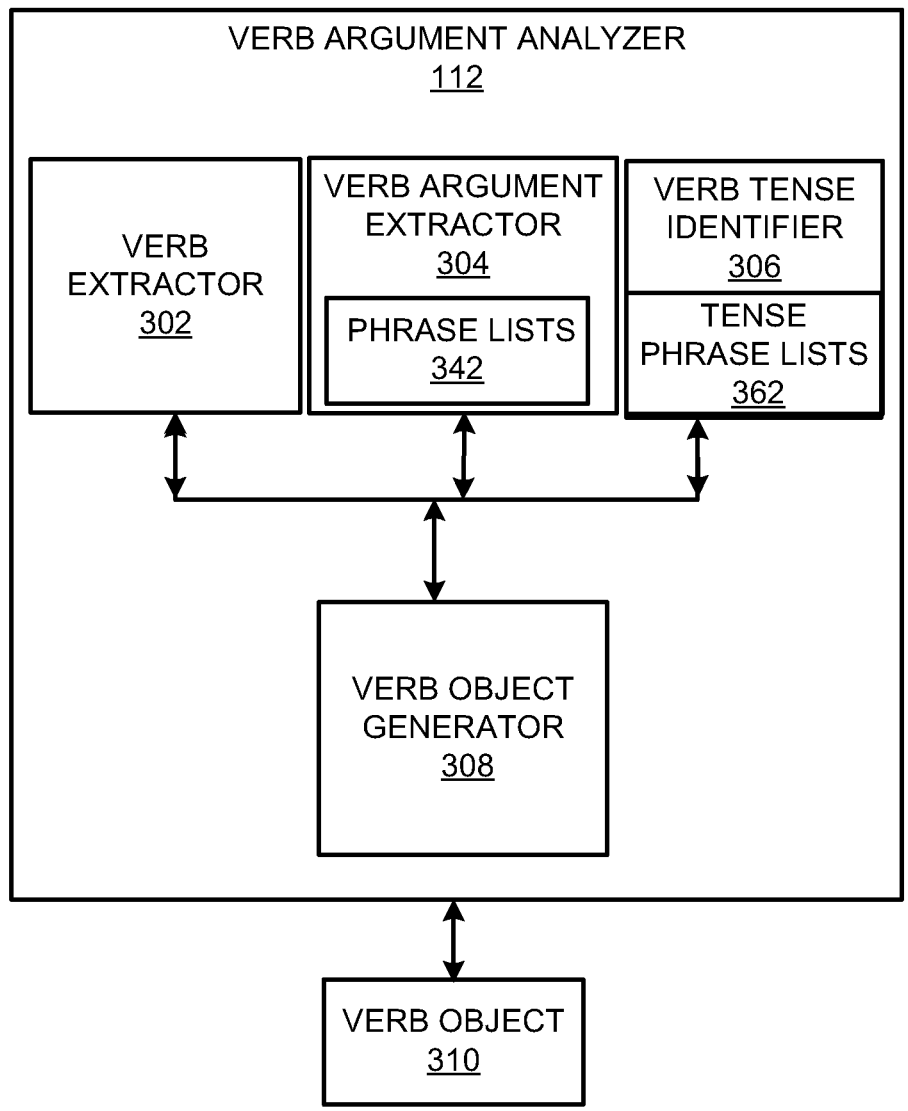
FIG. 3 shows a block diagram of a verb argument analyzer in accordance with the examples disclosed herein.

FIG. 3 shows a block diagram of the verb argument analyzer 112 in accordance with the examples disclosed herein. The verb argument analyzer 112 includes a verb extractor 302, a verb argument extractor 304, a verb tense identifier 306 and a verb object generator 308. The outputs from the plurality of parsers are accessed by the verb extractor 302 which employs the POS tags within the dependency parser outputs to extract verb phrases which can include verbs and one or more words preceding or succeeding the verbs in the user request with which the verbs bear dependency relationships. Furthermore, the verb extractor 302 also employs the dependency parser output to identify a major verb and one or more auxiliary verbs of the major verb in each of the verb phrases.

The verb argument extractor 304 can employ the output of the SRL parser 146 to identify relationships between the verbs and other words in the sentences. In an example, the verb argument extractor 304 can be configured with phrase lists 342 that include preconfigured or user-defined phrase lists to identify the different verb arguments using, for example, text matching techniques. For example, subject and object relationships of the words in the user query 150 with the major verb(s) can be identified. Moreover, the SRL parser output also enables identifying any temporal and location phrases that may be included in the user query 150. Other arguments such as negations, etc. can also be extracted from the SRL parser output. For example, if the output of the SRL parser 146 identifies the verb as having a negation component then the verb is marked as negated unless a polarity phrase such as "till", "until", "unless", etc., implying a negation cancelation are also identified. If the polarity phrase is detected in the user query 150 along with the negated verb, then the negation is canceled. For example, if the user query 150 includes a sentence, "I will not pay till next Tuesday", the verb negation "not pay" implies a failure to pay while the polarity phrase "till" enables the verb analyzer 112 that the payment will happen after next Tuesday. Therefore, the data related to the verbs in the user query 150 is extracted by the verb argument extractor 304. Similarly, the verb extractor 304 can be configured to identify willingness phrases. For example, one of the phrase lists 342 can include a willingness phrase list that can include a dataset representing willingness of action where the action is captured by a verb. For example, the willingness phrase list can include a dataset of phrases indicative of willingness such as but not limited to, {"ready to make", "will", "ready to", "willing to", "would like to", "willing", "will clear", "can", "want to", "able to", "may"}. Willingness can be marked similar to the verb tense and later utilized in the search of the knowledge graphs 154 for validation and proper intent assignment. An example, of intent derivation via verb modification by the willingness phrases can include user queries related to payments. If the payment-related term is identified as a future tense, it can be recorded that the user intent pertains to requesting an extension. However, if the payment related term identified as in future tense is associated with one of the willingness phrases in the verb phrase, then it can be converted to willing+future tense which maps to an a willing to pay intent.

Additionally, the verb tense identifier 306 executes a tense identifying process based on rules and using the tenses of the major verb(s) and the one or more auxiliary verbs. In an example, a tense can be assigned to each verb and a final tense can be assigned to the final verb phrase based on the tenses for each of the verbs in the verb phrase. The verb tense identifier 306 can include certain premade/predetermined tense phrase lists 362 which can be employed to identify the tenses of different verb phrases. The tense phrase lists 362 can include a temporal phrase list containing common temporal representations including future, past and present temporal phrases. In an example, the temporal phrase list may include phrases such as now, today, in a while, end of the day (EOD), end of business (EOB), evening, etc. Similarly, other lists may be included such as a future tense list including verb phrases and structures indicative of future tense such as get, has to be, to be with verb modifiers ending in "ll" such as shall, will, etc. The verb object generator 308 collates the information regarding the verbs in the user query that were collected to generate a 'verb object' 310.

In an example, the verbs and verb arguments thus extracted can be arranged in the form of tuples within the verb object 310 which is then transmitted to the knowledge processor 114 for further processing. Each of the verbs 188 extracted from the user query 150 can be paired with a proper noun or named noun (i.e., entity) identified in the subject and object with the major verb in a tuple and added to logical pairs key in the verb object 310. Similarly, an inferred verb tense can be paired with the major verb of the verb phrase and added to logical pairs key as a tuple in the verb object 310. The inferred verb tense can also be paired with the proper noun or named noun (i.e., entity) identified in the subject and object with the main verb in a tuple and added to the logical pairs key in the verb object 310. The pairings described herein may generate noisy tuples along with tuples containing granular information. However, validation of the tuples using the knowledge graphs 154 can enable filtering out the noisy tuples so that only the relevant tuples containing the granular information are selected for further processing.

Figure 4:
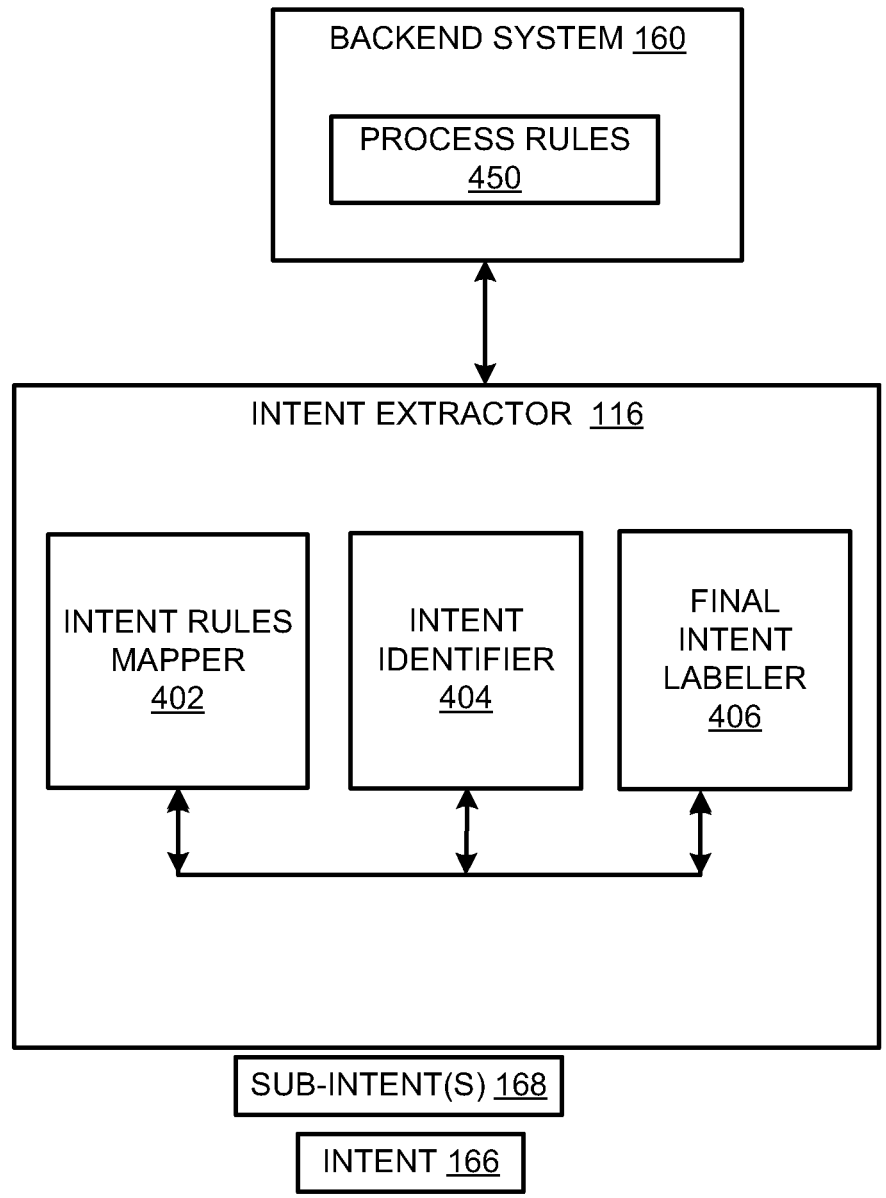
FIG. 4 shows a block diagram of an intent extractor in accordance with the examples disclosed herein.

FIG. 4 shows a block diagram of the intent extractor 116 in accordance with the examples disclosed herein. The intent extractor 116 includes an intent rule mapper 402, an intent identifier 404 and a final intent labeler 406. As mentioned above, the intent 166 for the user query 150 is based on the categories of the entities/verbs extracted from the user query 150. The intents are hierarchically arranged with an intent being associated with one or more sub-intents. The intent mapping rules 164 may map the entities, the entity affordances, the verbs, and the verb arguments to the sub-intents 168 associated with specific processes executed by the backend system 160. Therefore, it is the backend system 160 and the processes associated therewith that determine the intents/sub-intents. For example, if the backend system 160 is associated with billing processes, then the intents are also associated with the billing processes to pay the bills, questions regarding the billing details, details of services for which the bills are issued, etc.

When the entities 184 and the verbs 188 are categorized into specific nodes of the knowledge graphs 154, the intent mapping rules 164 stored in the corresponding nodes are applied to the entities 184 and to the verbs 188. More particularly, the entities 184 and the verbs 188 and their affordances are mapped to the corresponding sub-intents by the intent identifier 404. The sub-intents 168 thus mapped are normalized over the entities/verbs. The final intent labeler 406 accesses the sub-intents 168 and maps the sub-intents 168 to a final intent based on the process rules 450 associated with the process to be executed on the backend system 160 in response to the user query 150. The intent 166 is conveyed to the backend system 160 to initiate the process execution.

Figure 5A:
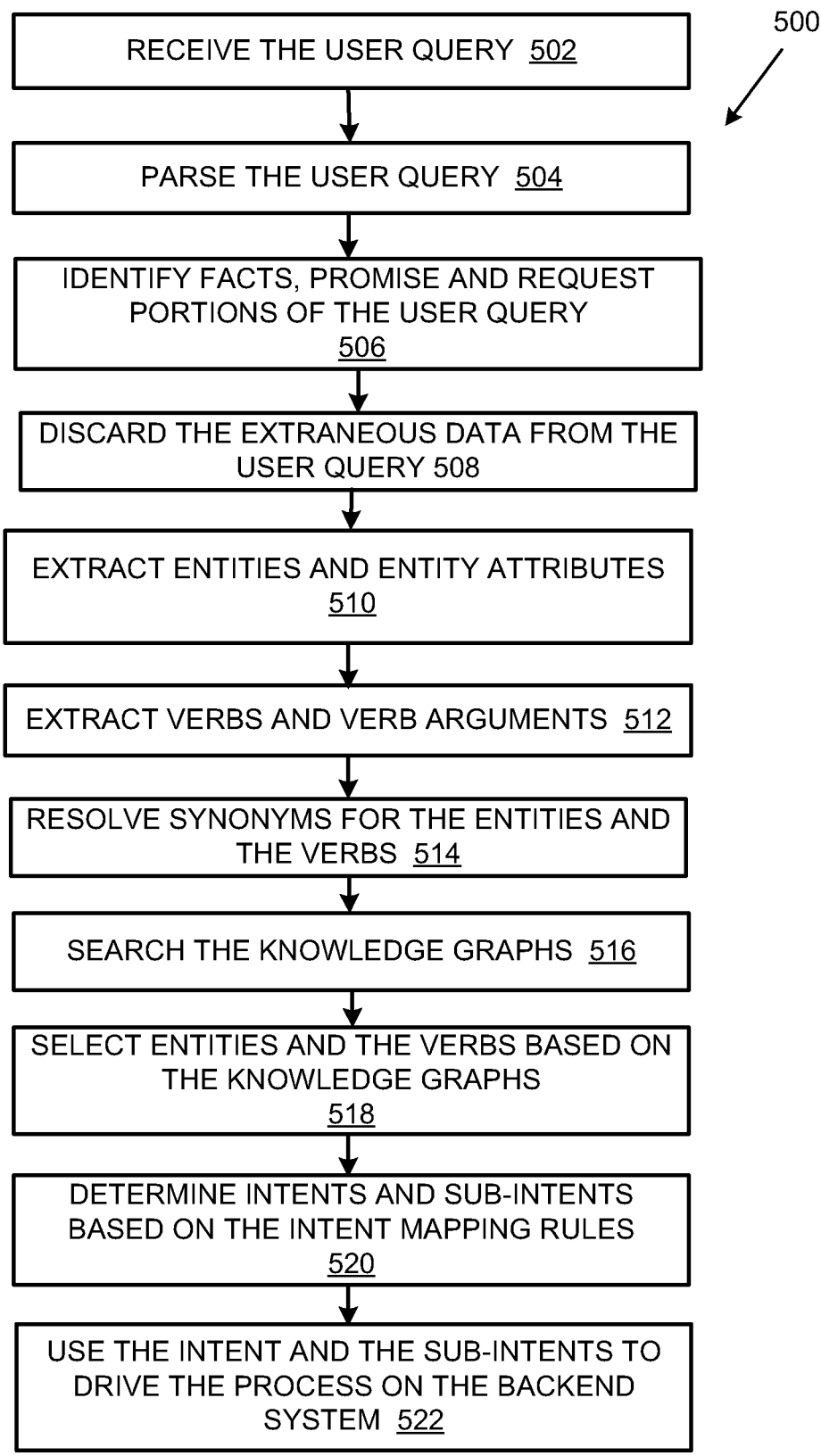
FIG. 5A shows a flowchart that details a method of extracting intent for enabling an automatic process on a backend system in accordance with the examples disclosed herein.

FIG. 5A shows a flowchart 500 that details a method of extracting intent for enabling execution of a process on the backend system 160 in accordance with the examples disclosed herein. The method begins at 502 with receiving the user query 150 via one of the various modalities. In an example, the user query 150 can include one or more sentences with statements and/or questions. The user query 150 can be received as an utterance via a voice interface either in a voice transmission or a video transmission. In an example, the user query 150 may be received as textual input. The user query 150, if received in non-textual inputs such as a voice input is converted into textual input by the query preprocessor 102 using the appropriate APIs and parsed at 504 using the plurality of parsers that include at least the dependency parser 144, the SRL parser 146 and the constituency parser 142. The constituency parser 142 can break a text into sub-phrases or constituents. The non-terminals in the resulting parse tree are types of phrases e.g., noun phrase, verb phrase, etc., while the terminals are the words in the sentence. The dependency parser 144 connects words according to their relationships. Each vertex in the dependency parse tree represents a word, child nodes are words that are dependent on the parent and the edges are labeled by the relationships. As a result, the dependency parse tree can point out the verbs, the subjects and the objects of the verbs in a given sentence. The SRL parser 146 provides an output with including the semantic arguments associated with the predicate or verb of a sentence and their classification into specific roles. Predicates may represent events while the semantic rules express the abstract roles that arguments of a predicate can take in the event. At 506, the FPR model 162 is employed to identify the facts, the promise and the resolution portions of the user query 150. At 508, the extraneous data portions of the user query 150 are discarded and the facts, the promise and the resolution portions of the user query 150 are selected for further processing.

In an example, the user query 150 can be analyzed to determine if any nouns are included. The nouns from the user query can be treated as entities. If one or more entities are identified, the entities 184 and the entity attributes are extracted at 510. At 512 the verbs 188 and verb arguments included in the user query 150 are extracted. At 514, the synonyms and/or morphological forms for the entities 184 and the verbs 188 are resolved using the synonym dictionary 182. In an example, entity pairs and verb pairs correspondingly including entities and verbs with other words in the user query 150 are generated. For example, an entity pair (entity, x) or a verb pair (verb, x) can be created where x is every word in the user query 150 having a dependency relationship with the entity/verb.

The knowledge graphs 154 are searched with the entity pairs and the verb pairs at 516. The entities 184, entity pairs and the verb pairs identified from the knowledge graphs 154 are selected for further processing at 518. Those entities 184, entity attributes or the verbs 188, verb arguments that were not identified from the knowledge graphs 154 are discarded from further consideration. The intent 166 and the sub-intent (s) 168 are determined at 520 based on the intent mapping rules 164. The intent 166 and the sub-intent(s) 168 are used at 522 to drive a process to be executed by the backend system 160.

Figure 5B:
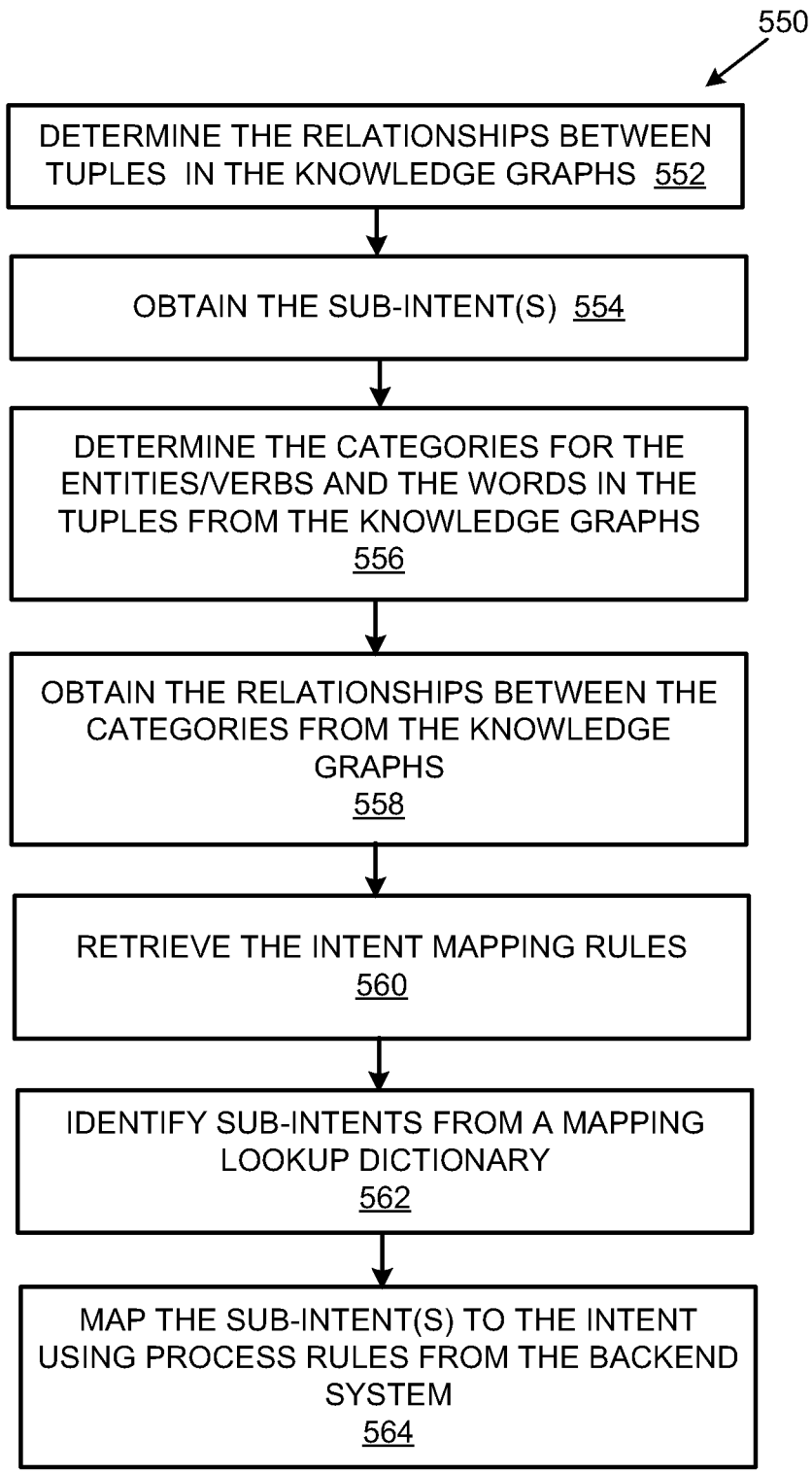
FIG. 5B shows a flowchart that details a method of identifying an intent and sub-intent(s) in accordance with the examples disclosed herein.

FIG. 5B shows a flowchart 550 that details a method of identifying the intent 166 and the sub-intent(s) 168 or the intermediate intent(s) in accordance with the examples disclosed herein. At 552, the relationships between the tuples or pairs (entity/verb, x) found in the knowledge graphs 154 are determined. For example, relationships such as but not limited to, 'type', 'has' and 'affordance' can be captured at 552. By following the hierarchy Type→Has→Affordance, the intermediate intent(s) or the sub-intent(s) 168 are obtained at 554. The categories for the entities 184, entity attributes and the verbs 188, verb arguments and the words paired therewith or included in each of the tuples are identified at 556 and the relationships between the categories are obtained at 558 using the knowledge graphs 154. The intent mapping rules 164 are retrieved at 560 from the nodes associated with the categories of the entities 184, entity attributes and the verbs 188, verb arguments in the knowledge graphs 154. In an example, the intent mapping rules 164 may access a mapping lookup dictionary at 562 to map the entities 184, the attributes of the entities 184, the verbs 188 and arguments of the verbs to one or more sub-intent(s) 168 at 564. The sub-intent(s) 168 thus retrieved can further employ the process rules 450 obtained from the backend system 160 to map the sub-intent(s) 168 to the intent 166 at 566.

Figure 6:
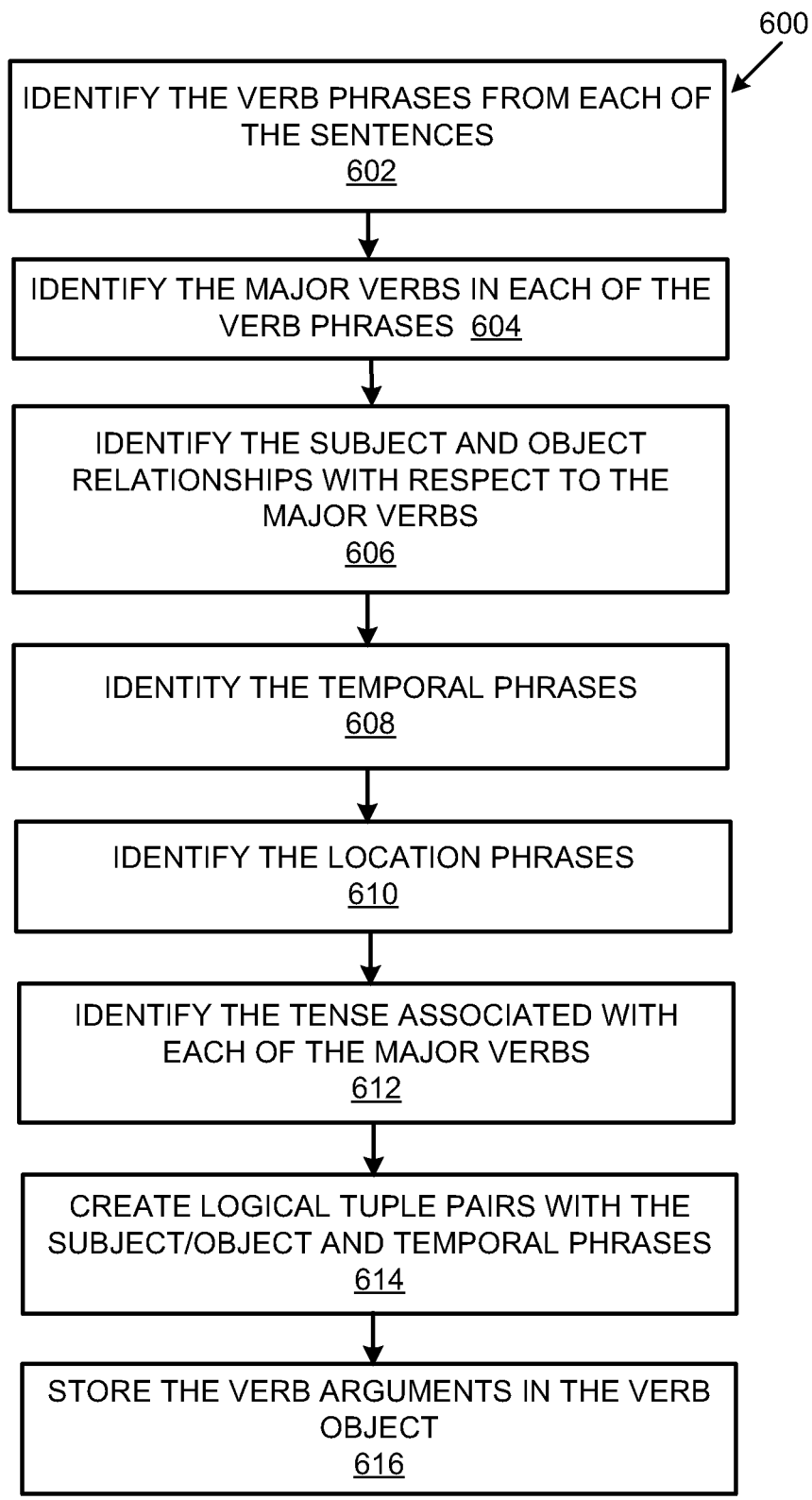
FIG. 6 shows a flowchart that details a method of extracting verbs and verb arguments in accordance with the examples disclosed herein.

FIG. 6 shows a flowchart 600 that details a method of extracting the verbs 188 and the verb arguments in accordance with the examples disclosed herein. The method begins at 602 wherein the verb phrases in each sentence of the user query 150 are identified from the output of the dependency parser 144. At 604, the SRL parser 146 output is accessed to identify the major verb in each of the verb phrases identified at 602. In an example, the POS tags from the output of the SRL parser 146 can be employed to identify at 606, the subject and object relationships with respect to the major verbs for each of the verb phrases in the user query 150. In addition, the tags from the output of the SRL parser 146 can be used to identify the temporal phrases at 608 and the location phrases at 610 if any. The tense associated with each of the major verbs is determined at 612. At 614, logical tuple pairs with the subjects, the objects and temporal phrases of each of the major verbs are created. For each verb that is identified, the noun identified in the subject and object with the major verb is used to create a tuple. For each verb, the inferred verb tense is paired with the major verb to create a tuple. For each verb, the inferred verb tense is paired with the noun identified in the subject and the object to generate a tuple. The various verb arguments thus paired into logical tuple pairs are stored in a specific data structure termed as the verb object 310 at 616. The verb object 310 thus created is passed on the intent analysis as described herein. The tuple pairs contain granular information and may also contain noisy tuples. However, validation from the knowledge graphs 154 enables retaining only those tuples which are relevant and contain granular information thereby providing for granular intents.

Figure 7:
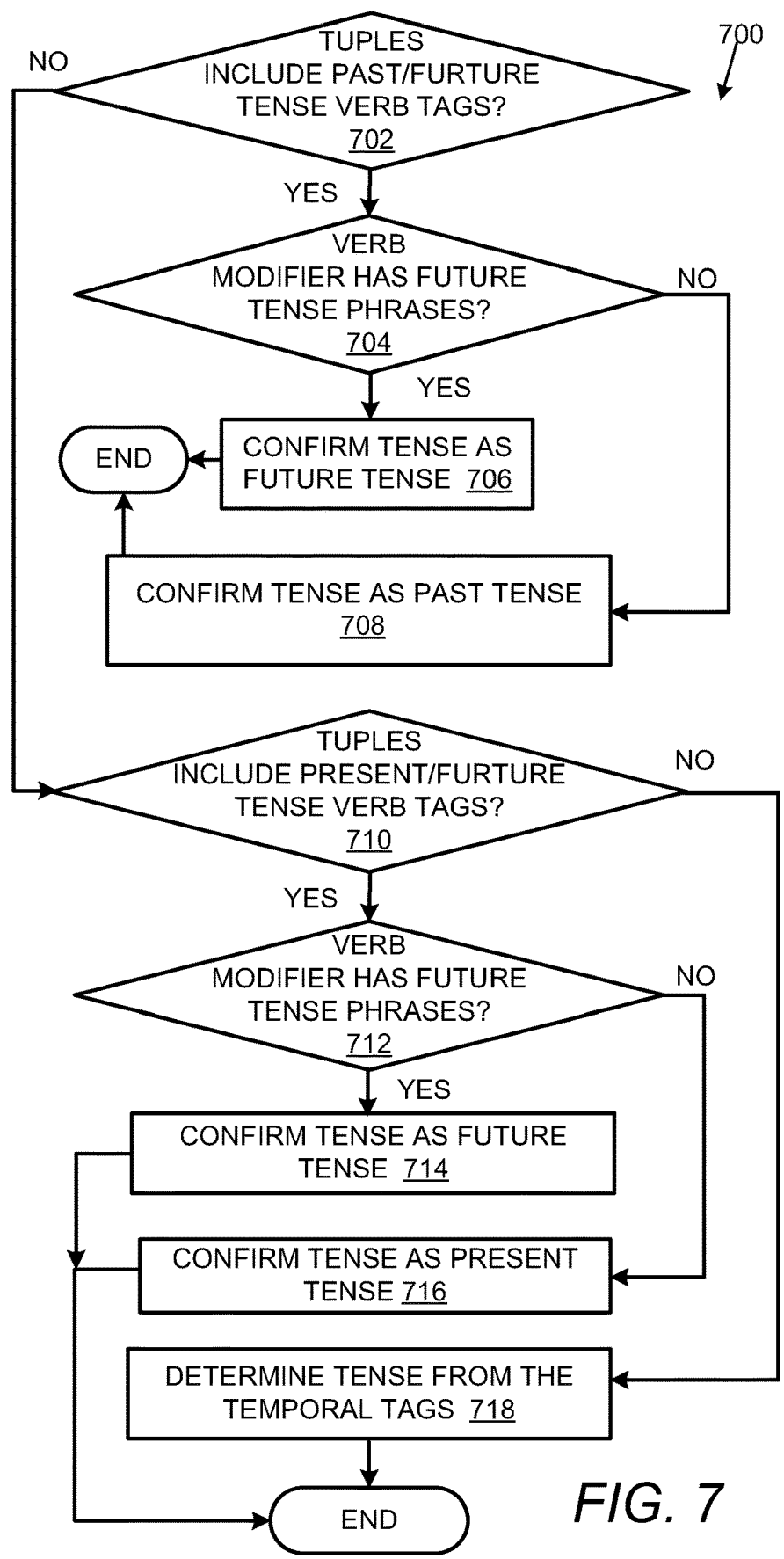
FIG. 7 shows a flowchart that details a method of determining the tense of a verb to determine the intent in a user query in accordance with the examples disclosed herein.

FIG. 7 shows a flowchart 700 that details a method of determining the tense of a verb in order to determine the intent in the user query 150 in accordance with the examples disclosed herein. The tense determination occurs with respect to the major verb phrase that is identified from the output of the SRL parser 146 in accordance with an example. Any temporal phrases that may be present in the user query 150 can also be employed for tense determination. The tense determination of the verbs in the user query 150 enables in determining the intent of the user query 150. For example, a user query may include a sentence such as, "The bill will be paid soon." The major verb "paid" from the sentence when analyzed alone indicates past tense, however, the verb phrase "will be paid" indicates future tense. Consequently, the intent analysis system 100 which is configured with the verb tense identifier 306 is able to automatically discriminate between the user intent to convey that the bill will be paid as opposed to the user intent conveying that the bill was already paid. Hence, the analysis of the verb phrases along with the major and auxiliary verbs is required to accurately determine the intent 166. The POS tags used for the tense analysis can be stored in the verb object 310 in an example. The tense determination occurs using the different tense phrases that can be retrieved from the tense phrase lists 362. Verb modifiers can also be used for tense identification as illustrated in the example above.

The tense determination process begins at 702 wherein it is determined if the tuples in the verb object 310 that include VBD or VBN tags which are indicative of verbs with past or future tenses. If any past or future tense verb tags are identified at 702, it is further determined at 704 if the verb is modified with future phrases included in the future tense list. As mentioned above, a verb with modifiers such as "shall", "will", etc. can be indicative of future tense. If it is determined at 704, that a future tense verb modifier is present in the verb phrase, then it is confirmed at 706 that the verb is a future tense verb. If no future tense verb modifier is included, then it is confirmed at 708 that it is a past tense verb.

If at 702, the tense was neither resolved as the past tense or the future tense, it is further determined at 710 if the tense is identified as one of a future or a present tense verb. Again, it is determined at 710 if the POS tags such as VBZ or VB are present in the tuples. If yes, then it is further determined at 712 if the verb is modified with future phrases included in the future tense list. If it is determined at 712, that a future tense verb modifier is present in the verb phrase, then it is confirmed at 714 that the verb is a future tense verb. If no future tense verb modifier is included, then it is confirmed at 716 that it is a present tense verb. If no verb tense tags could be identified from the tuples in the verb object at 702 or 710, the tense can be determined from the temporal tags obtained in the SRL parser output at 718.

Figure 8:
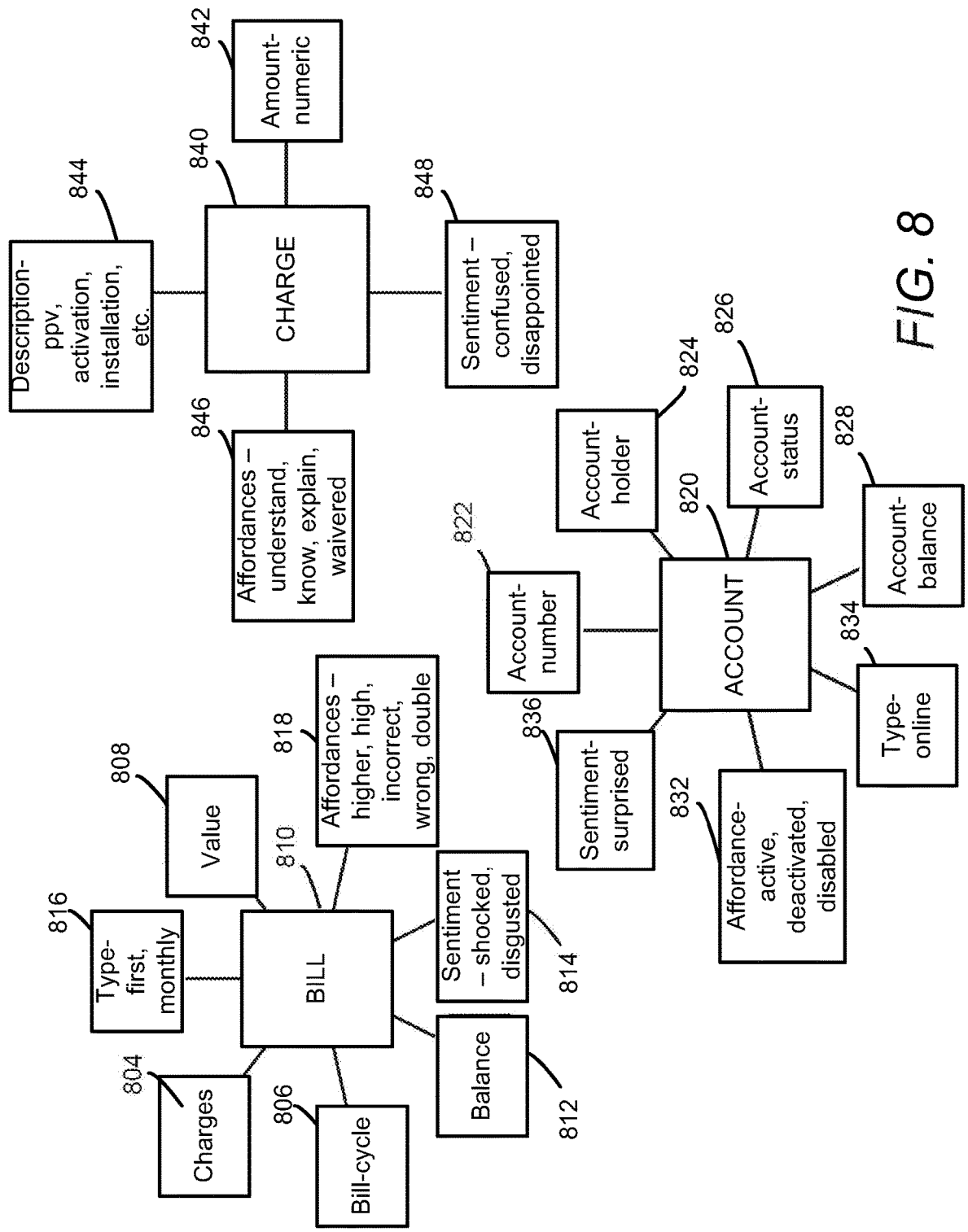
FIG. 8 shows some examples of knowledge graphs that are used for intent processing of the user query in accordance with the examples disclosed herein.

FIG. 8 shows some example representations of the knowledge graphs 154 that are used for intent processing of the user query 150 in accordance with the examples disclosed herein. The bill node of the knowledge graphs 154 can pertain to a entity with attributes such as charges 804, bill cycle 806, value 808, balance 812, etc. One of the attributes associated with the bill entity 810 can include sentiments 814 such as shocked, disgusted, etc. which are expressed by the users with respect to bills. In an example, sentiments regarding the entities 184, the entity attributes, the verbs and the verb arguments can be derived using sentiment extraction APIs on the user query 150. The bill entity 810 can have a type attribute 816 in addition to an affordance 818 attribute that can take one of the values—higher, high, incorrect, wrong, double, etc. The account entity 820 includes attributes such as account_number 822, account_holder 824, account_status 826, account_balance 828, affordance 832 which can take values such as active, deactivated, disabled, etc. In addition, an account type 834 is defined as taking an 'online' value and a 'surprised' sentiment 836 may be associated with the account entity 820. Similarly, a charge entity 840 can be defined with attributes such as amount 842 that can take numeric values, description attribute 844 that can take values such as activation, installation, etc., an affordance attribute 846 that can take values such as understand, know, explain, waivered, etc. In addition, sentiments 848 such as confused, disappointed, etc. can be expressed by users with respect to the charge sentiment.

FIG. 9A shows an example data structure 900 corresponding to the verb object 310 that is generated by the intent analysis system 100 in accordance with the examples disclosed herein. The data structure 900 includes verb arguments generated for the sentence 930, "The man saw the boy on the platform near Warwick last night." The verb arguments that are generated include 'verb_negated' which is indicative of whether verb is negated, 'isquery' and 'query' if 'isquery' is true, the 'Subj' argument which includes words forming the subject of the verb, 'the', 'man' along with the word indices that are indicative of the positions of the words in the sentence. The major verb itself is indicated as 'V' which is 'saw' with the index 2. The 'verb phrase' in this case includes only the major verb 'V'='saw'. The verb_analysis_element includes the verb, verb index, the verb POS tags 'VERB' and 'VBD' generated by one or more of the plurality of parsers. The object 'Obj' argument includes words 'the' and 'boy' forming the object of the major verb along with the corresponding indices. The temporal phrases 910 and the locative phrases 920 extracted from the output of the SRL parser 146 are also included in the data structure 900 corresponding to the verb object.

FIG. 9B shows another data structure 950 corresponding to another verb object generated from the sentence 960, "The man did not see the boy on the platform. Are you sure you saw him?" Description of the arguments such as 'verb_negated', 'isquery', etc. which are similar to the arguments discussed earlier is not repeated here for brevity purposes. The verb tense as detected by the verb tense identifier 306 is included in the arguments 'logical pairs' 952 and 954. The 'logical pairs' 952 argument includes the negated verb '!see' (i.e., not see) from the verb phrase 'did not see' as 'past tense'. Similarly, the 'logical pair' 954 has the verb 'saw' as past tense. Therefore, a methodology wherein just the tense of the verb 'see' is considered would classify the verb as present tense. However, by considering the verb phrase 'did not see' and taking into account the negation, the verb tense identifier 306 is able to accurately identify the verb in the context of 'did not see' as past tense.

Figure 10:
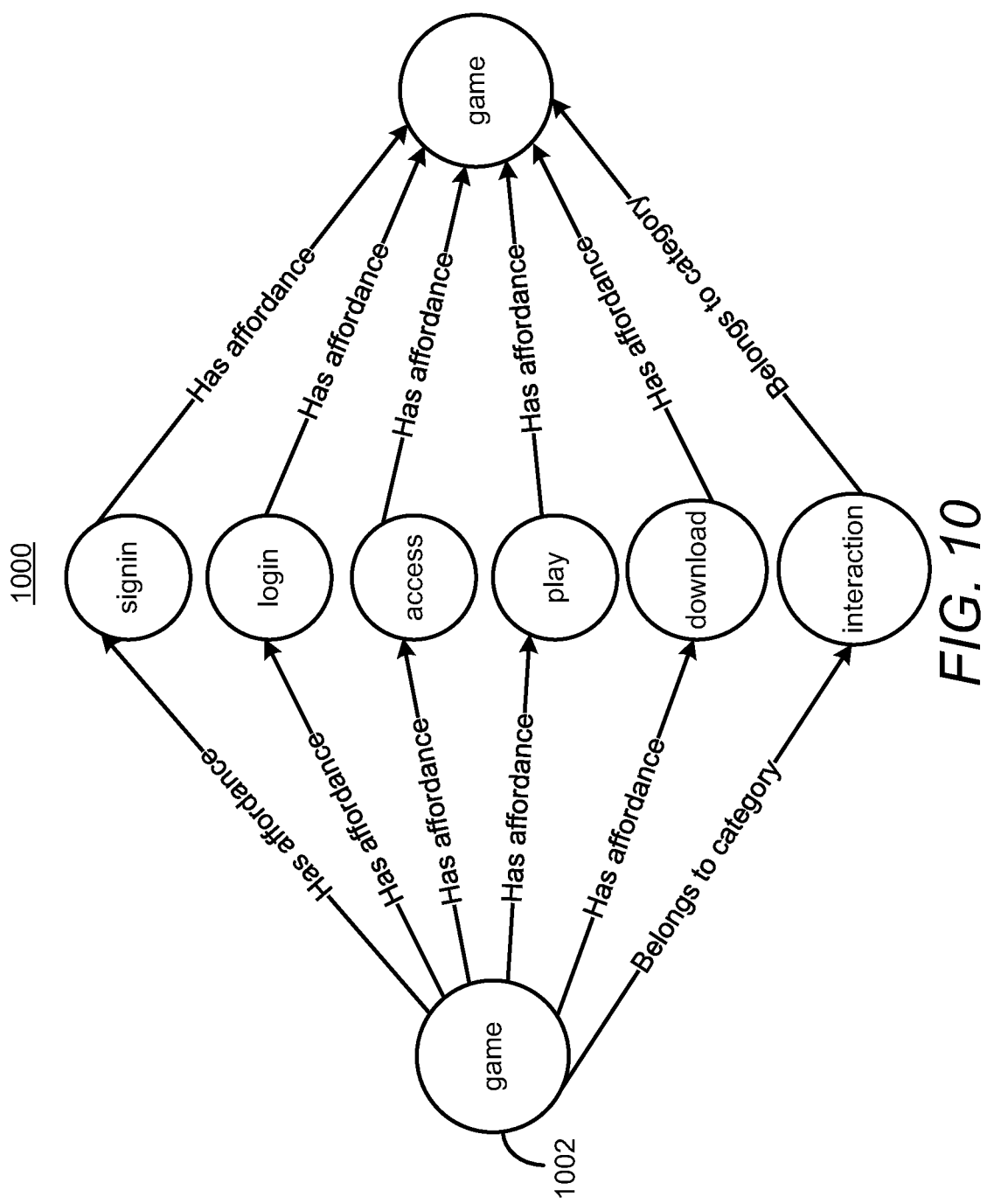
FIG. 10 shows a schematic diagram that details how an interactive game system can be supported by the intent analysis system in accordance with the examples disclosed herein.

FIG. 10 shows a schematic diagram 1000 that shows how an interactive game system can be supported by the intent analysis system 100 in accordance with the examples disclosed herein. As discussed above, one of the difficulties in adapting different automatic user interaction systems such as chat bots, etc., to different verticals or different processes is the lack of availability of training data. For example, if a billing interaction system is to be employed for processing user billing queries, then the components of the billing interaction system need to be trained on specific billing queries in order to accurately determine the intent of the user billing queries and provide an appropriate resolution. The knowledge base 152 makes the intent analysis system 100 flexible in that the intent analysis system 100 can be adapted from processing user billing queries to user queries regarding an interactive game without any additional training. The intent analysis system 100 can employ a knowledge base including the domain knowledge of the interactive gaming system and process user queries efficiently. The schematic diagram 1000 shows some of the domain knowledge of the interactive gaming system that may be encoded in the knowledge base 152. For example, 'game' 1002 can be modeled as an entity that has affordances such as sign in, login, access, pay, download, etc. The game 1002 entity belongs to the Interactivegames' category. Similarly, other attributes of the game 1002 entity or indeed other entities of the interactive gaming system can be modeled within the knowledge base. By using the knowledge base of the corresponding vertical, the intent analysis system 100 can be employed within the vertical without additional training. Such use without the need for training enables a more flexible user query intent determination that saves the time and efforts to gather training data and to train the intent analysis system 100 for the necessary functions using the training data.

Figure 11:
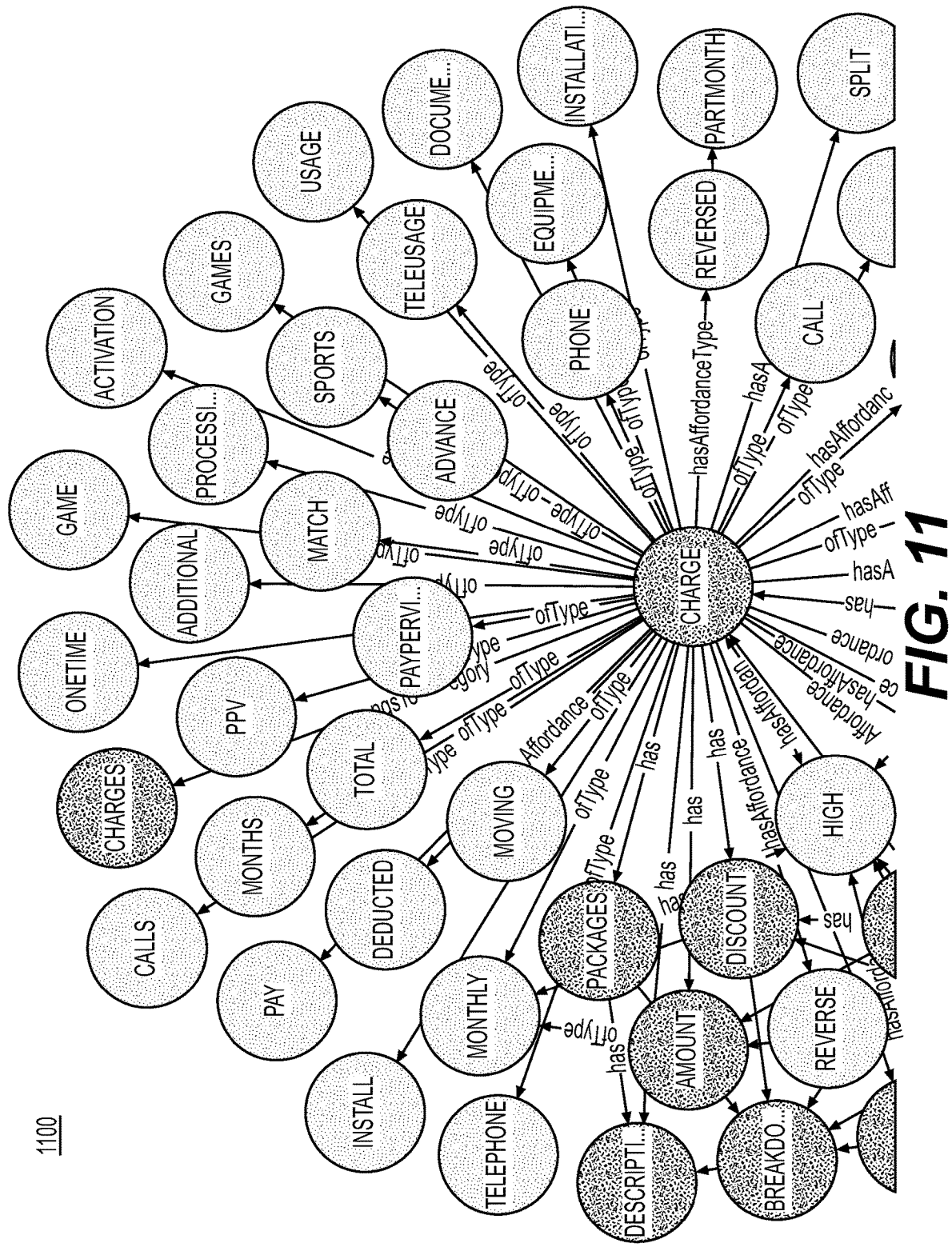
FIG. 11 shows a knowledge graph snapshot that aids in processing the user utterance in accordance with the examples disclosed herein.

FIG. 11 shows a knowledge graph 1100 that aids in processing the user utterance, "I've recently had xyz media installed I was told there would be no charge for equipment or installation and I requested a box in living room, one in my bedroom and one in each of my children's bedrooms, I was quoted £114 monthly for all my package and I've checked my bill and still being charged installation charge and you only fitted 3 boxes in the house and not 4." The entities extracted can include for example, ['bedroom', 'bedrooms', 'box', 'boxes', 'charge', 'children', 'equipment', 'house', 'installation', 'living', 'media', 'package', 'room']. The entity pairs and verb pairs generated can include for example, ('a', 'box'), ('all', 'package'), ('bedroom', 'bedrooms'), ('bedroom', 'in'), ('bedrooms', 'bill'), ('bedrooms', 'of'), ('bill', 'box'), ('bill', 'checked'), ('box', 'requested'), ('boxes', 'charge'), ('boxes', 'fitted'), ('bedrooms', 'children'), ('equipment', 'house'), ('charge', 'for'), ('house', 'in'), ('house', 'installation'), ('charge', 'installation'), ('equipment', 'installation') etc. The sub-intents that are extracted can include 'equipment charge', 'installation charge'. The final intents can be derived at different granularities. For example, at a higher granularity an intent 'firstbill.onetimecharge' can be derived while at a finer granularity, 'firstbill.onetimecharge.installationfees' can be derived. Therefore, a more precise response pertaining to the installation fee which is part of the one time charge can be provided.

FIG. 12 illustrates a computer system 1200 that may be used to implement the intent analysis system 100. More particularly, computing machines such as desktops, laptops, smartphones, tablets, and wearables which may be used to generate or access the data from the intent analysis system 100 may have the structure of the computer system 1200. The computer system 1200 may include additional components not shown and that some of the process components described may be removed and/or modified. In another example, a computer system 1200 can sit on external-cloud platforms such as Amazon Web Services, AZURE® cloud or internal corporate cloud computing clusters, or organizational computing resources, etc.

The computer system 1200 includes processor(s) 1202, such as a central processing unit, ASIC or another type of processing circuit, input/output devices 1212, such as a display, mouse keyboard, etc., a network interface 1204, such as a Local Area Network (LAN), a wireless 802.11x LAN, a 3G or 4G mobile WAN or a WiMax WAN, and a processor-readable medium 1206. Each of these components may be operatively coupled to a bus 1208. The computer-readable medium 1206 may be any suitable medium that participates in providing instructions to the processor(s) 1202 for execution. For example, the processor-readable medium 1206 may be non-transitory or non-volatile medium, such as a magnetic disk or solid-state non-volatile memory or volatile medium such as RAM. The instructions or modules stored on the processor-readable medium 1206 may include machine-readable instructions 1264 executed by the processor(s) 1202 that cause the processor(s) 1202 to perform the methods and functions of the intent analysis system 100.

The intent analysis system 100 may be implemented as software stored on a non-transitory processor-readable medium and executed by the processors 1202. For example, the processor-readable medium 1206 may store an operating system 1262, such as MAC OS, MS WINDOWS, UNIX, or LINUX, and code 1264 for the intent analysis system 100. The operating system 1262 may be multi-user, multiprocessing, multitasking, multithreading, real-time, and the like. For example, during runtime, the operating system 1262 is running and the code for the intent analysis system 100 is executed by the processor(s) 1202.

The computer system 1200 may include a data storage 1210, which may include non-volatile data storage. The data storage 1210 stores any data used by the intent analysis system 100. The data storage 1210 may be used to store the user query 150, the entities 184, entity attributes, the verbs 188, and verb arguments extracted from the user query and other data that is used by the intent analysis system 100 during operation.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based user query intent analysis system, comprising:
   at least one processor;
   a non-transitory processor-readable medium storing machine-readable instructions that cause the processor to:
   parse a user query using a plurality of parsers that include at least a dependency parser and a semantic role labeling (SRL) parser, wherein the user query relates to a process to be executed by a backend system;
   identify a plurality of portions from the user query, wherein the plurality of portions include at least a fact portion, a promise portion, a resolution portion and a redundant information portion using a facts-promise-resolution (FPR) model;
   select a subset of the plurality of portions for further analysis, wherein the subset of the portions includes the fact portion, the promise portion, and the resolution portion;
   extract at least one entity and at least one verb from the subset, wherein the extraction includes generation of tuples of the at least one entity and attributes of the at least one entity included in the user query;
   identify arguments corresponding to the at least one verb from an output of the dependency parser;
   generate tuples of the at least one verb and the arguments of the at least one verb;
   validate the at least one entity and the at least one verb by determining if one of the at least one entity and the at least one verb is included in a knowledge base associated with the backend system;
   determine an intent of the user query from intent mapping rules that map the at least one entity and the at least one verb phrase to corresponding intents; and
   enable execution of the process on the backend system by transmitting the intent to the backend system, wherein the process determines if a request in the resolution portion of the user query can be approved based at least on process rules that are used to validate at least one of the fact portion and the promise portion.

2. The query intent analysis system of claim 1, wherein the processor is to further:
   receive the user query as an utterance; and
   convert voice input from the utterance into a textual format using voice to text application programming interfaces (APIs).

3. The query intent analysis system of claim 1, wherein the FPR model is a conditional random field (CRF) model.

4. The query intent analysis system of claim 1, wherein to extract the at least one entity and the attributes of the at least one entity the processor is to further:
   identify the at least one entity and value of an affordance attribute of the entity by analyzing outputs from the plurality of parsers, wherein the affordance attribute determines a state of the at least one entity; and
   generate the tuples with the at least one entity and the attributes with each word in the user query that has a dependency relationship therewith, wherein the word is identified from the output of the dependency parser.

5. The query intent analysis system of claim 1, wherein the processor is to further:
   identify synonyms of the at least one entity and the attributes using a synonym dictionary.

6. The query intent analysis system of claim 1, wherein to identify the at least one verb the processor is to further:
   identify a verb phrase with multiple words that include the at least one verb as a major verb, the verb phrase is identified using parts of speech (POS) tags in an output from the dependency parser; and
   identify a subject and an object in the user query relative to the major verb from an output of the SRL parser.

7. The query intent analysis system of claim 1, wherein to identify the arguments corresponding to the at least one verb the processor is to further:
   additionally identify at least one or more of temporal phrases and location phrases from the output of the SRL parser.

8. The query intent analysis system of claim 1, wherein to identify the arguments corresponding to the at least one verb the processor is to further:
identify a tense associated with the at least one verb.

9. The query intent analysis system of claim 8, wherein to identify the tense associated with the at least one verb the processor is to further:
identify tags associated with the verb in an output of the SRL parser; and
confirm a tense of the verb based on the tags.

10. The query intent analysis system of claim 9, wherein to identify the tense associated with the at least one verb the processor is to further:
identify a tense associated with the at least one verb based on a temporal tag included in an output of the SRL parser.

11. The query intent analysis system of claim 1, wherein the processor is to further:
generate a verb object that includes the at least one verb and the arguments of the at least one verb extracted from the user query.

12. The query intent analysis system of claim 1, wherein to determine the intent of the user query the processor is to further:
identify a subset of the tuples from knowledge graphs; and
obtain sub-intents based on relationships between the tuples in the knowledge graphs.

13. The query intent analysis system of claim 12, wherein to determine the intent of the user query the processor is to further:
obtain categories for the tuples included in the knowledge graphs; and
retrieve intent mapping rules from nodes of the knowledge graphs associated with the categories of the tuples.

14. The query intent analysis system of claim 13, wherein to determine the intent of the user query the processor is to further:
map the intent to the sub-intents based on rules pertaining to the process to be executed by the backend system.

15. A method of enabling execution of a process on a backend system based on an intent conveyed in a user query comprising:
parsing the user query using a plurality of parsers that include at least a dependency parser and a semantic role labeling (SRL) parser;
selecting a subset of portions including at least a fact portion, a promise portion, and a resolution portion from a plurality of portions identified from the user query;
extracting at least one entity and attributes of the at least one entity from the subset of the portions formed from the user query;
extracting at least one verb and arguments corresponding to the at least one verb from the subset of the portions formed from the user query based on tags from an output of the dependency parser;
determining a tense of the at least one verb as one of the arguments, wherein the tense of the verb is determined based at least on tags associated with one of the at least one verb and a modifier of the at least one verb in an output of the SRL parser;
resolving for synonyms of the at least one entity, the attributes of the at least one entity, the at least one verb and the arguments of the at least one verb by employing a synonym dictionary from a knowledge base;
selecting a subset of tuples including the at least one entity and a subset of the tuples including the at least one verb based on identification from knowledge graphs of the knowledge base;
extracting categories and intent mapping rules associated with each of the subsets of the tuples from the knowledge graphs, wherein the intent mapping rules are extracted based on the categories;
identifying one or more sub-intents from the intent mapping rules; and
determining the intent of the user query by mapping the sub-intents to the intent using process rules from the backend system.

16. The method of claim 15, further comprising:
resolving the at least one entity, attributes of the at least one entity, the at least one verb, and the arguments of the at least one verb for one or more of synonyms and morphological forms using a synonym dictionary from the knowledge base.

17. The method of claim 15, wherein extracting arguments of the at least one verb further comprises:
extracting one or more of at least one temporal phrase and at least one location phrase from the user query by employing tags from an output of the SRL parser.

18. The method of claim 17, wherein determining the tense of the at least one verb further comprises:
determining the tense of the at least one verb based on a tense of the at least one temporal phrase.

19. A non-transitory processor-readable storage medium comprising machine-readable instructions that cause a processor to:
parse a user query using a plurality of parsers that include at least a dependency parser and a semantic role labeling (SRL) parser, wherein the user query relates to a process to be executed by a backend system;
identify a plurality of portions from the user query, wherein the plurality of portions include at least a fact portion, a promise portion, a resolution portion, and a redundant information portion;
select a subset of the plurality of portions for further analysis, wherein the subset of the portions includes the fact portion, the promise portion, and the resolution portion;
extract at least one entity from the subset of the portions, wherein the extraction includes generation of tuples of the at least one entity and attributes of the at least one entity included in the user query;
identify at least one verb and arguments corresponding to the at least one verb from an output of the dependency parser;
generate tuples of the at least one verb and arguments of the at least one verb included in the user query;
validate the fact portion and the promise portion of the user query by determining if one of the at least one entity and the at least one verb is included in a knowledge base associated with the backend system;
determine an intent of the user query from an intent mapping that maps one of the at least one entity and the at least one verb to corresponding intents based on rules; and
enable execution of the process on the backend system by transmitting the intent to the backend system, wherein the process determines if a request in the resolution portion of the user query can be approved based at least on validation of the fact portion and the promise portion.

20. The non-transitory processor-readable storage medium of claim 19, wherein the instructions to identify the plurality of portions further comprises instructions that cause the processor to:
  using a classifier model to process an output of the SRL parser.

* * * * *